(12) United States Patent
Messick et al.

(10) Patent No.: US 10,955,890 B2
(45) Date of Patent: Mar. 23, 2021

(54) SYSTEM AND METHOD OF UTILIZING INFORMATION HANDLING SYSTEMS WITH MULTIPLE POWER LEVELS

(71) Applicant: Dell Products L.P., Round Rock, TX (US)

(72) Inventors: Douglas Evan Messick, Austin, TX (US); Kyle E. Cross, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 229 days.

(21) Appl. No.: 16/054,491

(22) Filed: Aug. 3, 2018

(65) Prior Publication Data

US 2020/0042063 A1 Feb. 6, 2020

(51) Int. Cl.
| | |
|---|---|
| G06F 1/26 | (2006.01) |
| G06F 1/28 | (2006.01) |
| G06F 1/18 | (2006.01) |
| G06F 1/324 | (2019.01) |

(52) U.S. Cl.
CPC ............... G06F 1/28 (2013.01); G06F 1/189 (2013.01); G06F 1/263 (2013.01); G06F 1/324 (2013.01)

(58) Field of Classification Search
None
See application file for complete search history.

(56) References Cited

U.S. PATENT DOCUMENTS

| | | | | |
|---|---|---|---|---|
| 2010/0038963 | A1* | 2/2010 | Shetty | G06F 11/3062 307/62 |
| 2010/0211804 | A1* | 8/2010 | Brumley | G06F 1/206 713/300 |
| 2014/0132070 | A1* | 5/2014 | Kuan | H02J 9/061 307/29 |
| 2014/0277784 | A1* | 9/2014 | Mick | H05K 7/1498 700/286 |
| 2017/0010652 | A1* | 1/2017 | Huang | G06F 11/0793 |
| 2019/0018469 | A1* | 1/2019 | Su | G06F 1/32 |

* cited by examiner

*Primary Examiner* — Danny Chan
(74) *Attorney, Agent, or Firm* — Baker Botts L.L.P.

(57) ABSTRACT

In one or more embodiments, one or more systems, methods, and/or processes may query each component of multiple components of a system for multiple power utilization attributes associated with the component; may determine a power budget based at least on each multiple power utilization attributes of each component of the multiple components; may determine an integer number of power supply units based at least on the power budget; may determine a fail safe power level based at least on power provided by the integer number of power supply units; may determine, based at least on the fail safe power level, multiple component fail safe power levels respectively associated with the multiple components of the system; and may provide, to each component of the multiple components, configuration information associated with a respective component fail safe power level, of the multiple component fail safe power levels, respectively associated with the component.

20 Claims, 6 Drawing Sheets

SYSTEM AND METHOD OF UTILIZING INFORMATION HANDLING SYSTEMS WITH MULTIPLE POWER LEVELS

BACKGROUND

Field of the Disclosure

This disclosure relates generally to information handling systems and more particularly to systems that include information handling systems that can operate with multiple power levels.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may query each component of multiple components of a system for multiple power utilization attributes associated with the component; may determine a power budget based at least on each multiple of power utilization attributes of each component of the multiple components of the system; may determine an integer number of power supply units based at least on the power budget; may determine a fail safe power level based at least on power provided by the integer number of power supply units; may determine, based at least on the fail safe power level, multiple component fail safe power levels respectively associated with the multiple components of the system; may provide, to each component of the multiple components of the system, configuration information associated with a respective component fail safe power level, of the multiple component fail safe power levels, respectively associated with the component; and may determine that an issue associated with an enclosure controller occurred. For example, the enclosure controller may include a chassis management controller. In one or more embodiments, in response to determining that the issue associated with the enclosure controller occurred, the multiple components of the system may utilize a respectively associated multiple component power levels that do not exceed the respectively associated multiple component fail safe power levels.

In one or more embodiments, the multiple components of the system utilizing the respectively associated multiple component power levels that do not exceed the respectively associated multiple component fail safe power levels may include at least two of the multiple components of the system reducing respective power consumptions. In one or more embodiments, at least one component of the multiple components of the system may utilize a first power level. For example, the at least one component of the multiple components of the system may utilize a second power level that is greater than the first power level and that does not exceed its respectively associated component fail safe power level. In one or more embodiments, the multiple components of the system includes multiple information handling systems. For example, the multiple components of the system utilizing the respectively associated multiple component power levels may include configuring at least one information handling system of the multiple information handling systems to process less information within a time period. For instance, configuring the at least one information handling system of the multiple information handling systems to process less information within the time period may include configuring a processor of the at least one information handling system of the multiple information handling systems to not exceed a clock rate. In one or more embodiments, a chassis may house the multiple information handling systems. For example, the chassis may further house multiple power supply grids that are configured for grid redundancy. For instance, at least two of the multiple power supply grids may include the integer number of power supply units.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
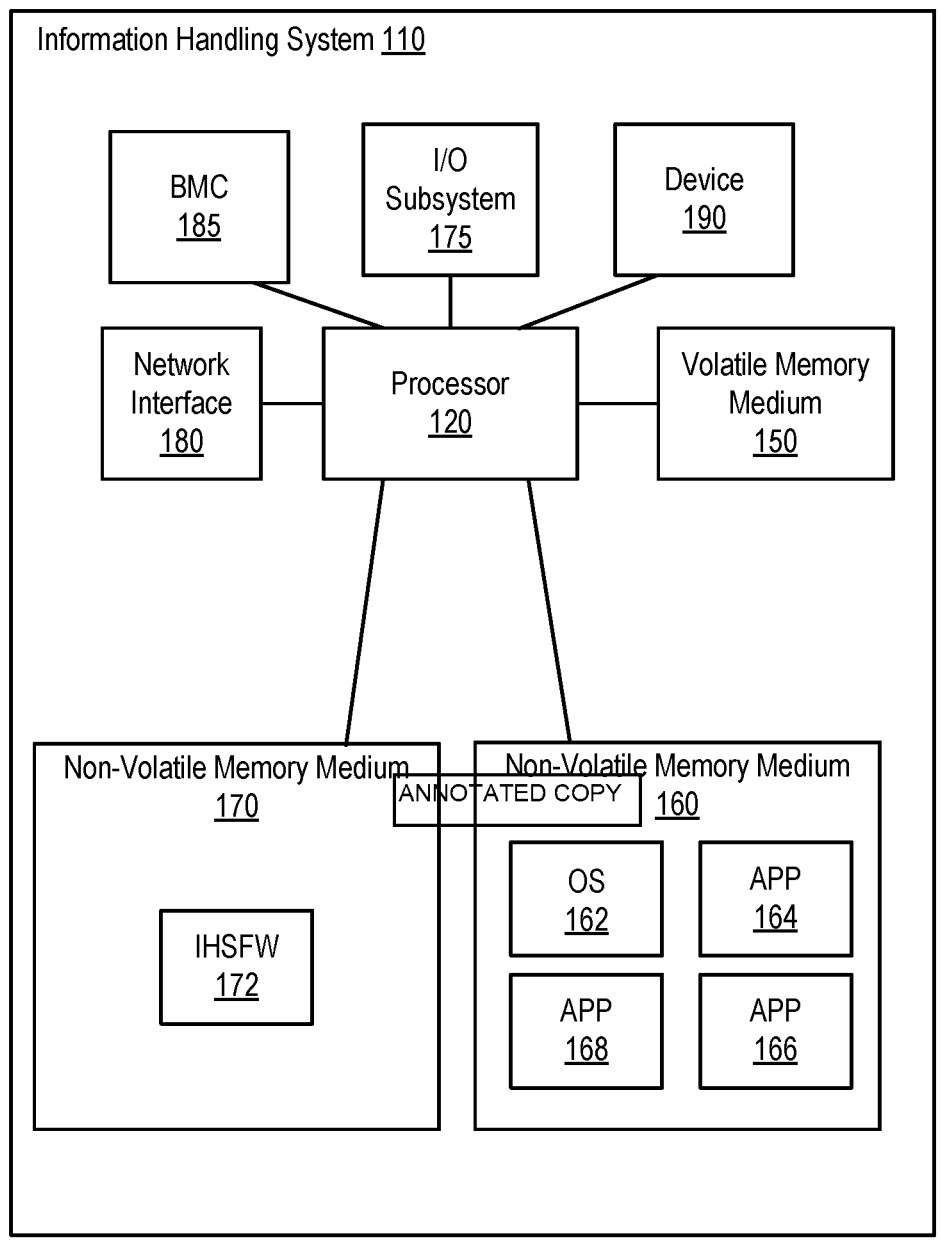
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a chassis may house one or more information handling systems. For example, the chassis may house an enclosure controller that may manage power from power supply units to the one or more information handling systems and/or to one or more other components housed by the chassis. For instance, the one or more other components housed by the chassis may include one or more non-volatile storage devices, one or more input/output modules, and/or one or more fans, among others. In one or more embodiments, the enclosure controller may manage power consumption by the one or more information handling systems and/or to the one or more other components housed by the chassis. For example, the enclosure controller managing power consumption by the one or more information handling systems and/or to the one or more other components housed by the chassis may prevent the power supply units from overloading. For instance, the enclosure controller may configure one or more power consumption levels of the one or more information handling systems and/or to the one or more other components housed by the chassis such that the one or more power consumption levels do not overload the power supply units. In one or more embodiments, if a power supply is overloaded, the power supply may cease to function. For example, it may cease to function for a period of time. For instance, the power supply may reset, where the power supply may cease to function for a period of time while the power supply resets.

In one or more embodiments, the enclosure controller may not be available to manage power from power supply units to the one or more information handling systems and/or to the one or more other components housed by the chassis. For example, if the enclosure controller is not available to manage power from power supply units to the one or more information handling systems and/or to the one or more other components housed by the chassis, the one or more information handling systems and/or to the one or more other components housed by the chassis may operate at respective fail safe power levels. For instance, the one or more information handling systems and/or to the one or more other components housed by the chassis may operate at respective fail safe power levels so that if a power supply unit is no longer able to provide power, the one or more information handling systems and/or to the one or more other components housed by the chassis may continue operate. In one or more embodiments, a fail safe power level may be associated with a fail safe power limit. For example, a fail safe power level may be a power level up to a limit of power, such as a fail safe power limit. For instance, components of an information handling system and/or a chassis may utilize respective fail safe power levels, which may be limited to respective fail safe power limits, during a fail safe operation of the information handling system and/or a fail safe operation of the chassis. In one or more embodiments, one or more information handling systems and/or to the one or more other components housed by the chassis may limit their power consumptions. For example, the one or more information handling systems and/or to the one or more other components housed by the chassis may limit their power consumptions to respective one or more fail safe power levels.

In one or more embodiments, a fail safe power level (FSPL) may be determined based at least on a number of power supply units (PSUs) that are requisite for redundancy. For example, the number of PSUs that are requisite for redundancy may be an integer number of PSUs that are requisite for redundancy. In one or more embodiments, the FSPL may include a fraction of power produced by the number of PSUs that are requisite for redundancy. For example, the FSPL may be or include eighty percent (80%) of power produced by the number of PSUs that are requisite for redundancy. In one or more embodiments, power levels based at least on the FSPL may be allocated to one or more information handling systems and/or to one or more other components housed by a chassis. In one or more embodiments, the FSPL may permit and/or allow a surplus of available power. In one or more embodiments, the surplus of available power may be for changes in power utilization. In one example, the changes in power utilization may include one or more power utilization increases of the one or more information handling systems and/or one or more power utilization increases of the components of the chassis. In another example, the surplus of available power may be for loss of capacity of one or more of the PSUs.

In one or more embodiments, the one or more information handling systems may be throttled to comply with a FSPL. In one example, throttling the one or more information handling systems may include configuring at least one of the one or more information handling systems to consume less power. In another example, throttling the one or more information handling systems may include configuring at least one of the one or more information handling systems to process less information within a time period.

In one or more embodiments, a component of a chassis or of an information handling system may be associated with multiple power consumption levels. For example, the multiple power consumption levels may include a node lower boundary (NLB) power level, a thermal design point (TDP) power level, and a fault tolerant boundary (FTB) power level, among others. In one instance, the NLB power level may be a throttled power level. In a second instance, a TDP power level may be a power level above the NLB power level and below the FTB power level. In another instance, the FTB power level may be a maximum power level. In one or more embodiments, a TDP power level may be a "name plate" power level. For example, the "name plate" power level may be a typical power level for normal operations.

In one or more embodiments, a power consumption inventory of a chassis may be determined. For example, the power consumption inventory of the chassis may include a NLB power level, a TDP power level, and a FTB power level of components of the chassis. In one or more embodiments, one or more components of the chassis may not be configurable to operate at multiple power levels. For example, a power level associated with a component of the chassis that is not able to operate at multiple power levels may include a power rating of the component.

In one or more embodiments, a number of PSUs may be determined based at least on TDP power levels of information handling systems and other components of a chassis. For example, a quantity of PSUs of the number of PSUs determined may provide a first power level. In one or more embodiments, a second power level may be determined based at least on the first power level. For example, the second power level may be a fraction of the first power level. For instance, the second power level may be eighty percent (80%) of the first power level. In one or more embodiments, the second power level may be utilized as a FSPL.

In one or more embodiments, the fail safe power budget may permit the one or more information handling systems to operate above a NLB power level while providing for a surplus power budget. For example, permitting the one or more information handling systems to operate above a NLB power level may permit the one or more information handling systems to process more information in a period of time than the one or more information handling systems would if the one or more information handling systems utilized the NLB power level.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, a baseboard management controller (BMC) 185, and a device 190. As illustrated, volatile memory medium 150, non-volatile memory media 160 and 170, I/O subsystem 175, network interface 180, BMC 185, and device 190 may be communicatively coupled to processor 120.

In one or more embodiments, one or more of volatile memory medium 150, non-volatile memory media 160 and 170, I/O subsystem 175, network interface 180, BMC 185, and device 190 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one or more embodiments, processor 120 may execute processor instructions in implementing at least a portion of one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others.

In one or more embodiments, BMC 185 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be configured, coded, and/or encoded with instructions in accordance with one or more of systems, flowcharts, methods, and/or processes described herein. In one or more embodiments, BMC 185 may be configured to implement at least a portion of one or more systems, one or more flowcharts, one or more methods, and/or one or more processes described herein. In one or more embodiments, BMC 185 may be or include one or more of a field programmable gate array (FPGA) and an ASIC, among others, configured, coded, and/or encoded with instructions in accordance with one or more of systems, one or more flowcharts, one or more methods, and/or one or more processes described herein.

In one or more embodiments, device 190 may be or include a programmable logic device. In one example, device 190 may be or include a FPGA. In another example, device 190 may be or include a complex programmable logic device (CPLD). For instance, a CPLD may include one or more structures and/or functionalities of a FPGA and/or one or more structures and/or functionalities of a programmable array logic (PAL), among others. In one or more embodiments, device 190 may be or include an ASIC. Although not specifically illustrated, BMC 185 may include device 190, according to one or more embodiments. In one or more embodiments, device 190 may be or implement a power controller of IHS 110. For example, device 190 may control one or more levels of power utilized by IHS 110. For instance, device 190 may configure IHS 110 to utilize one or more of a NLB power level, a TDP power level, and a FTB power level, among others. In one or more embodiments, device 190 may be configured to implement one or more systems, one or more flowcharts, one or more methods, and/or one or more processes described herein. In one or more embodiments, device 190 may be configured to implement at least a portion of one or more systems, one or more flowcharts, one or more methods, and/or one or more processes described herein.

In one or more embodiments, processor 120 and one or more components of IHS 110 may be included in a system-on-chip (SoC). For example, the SoC may include processor 120 and a platform controller hub (not specifically illustrated).

Figure 2:
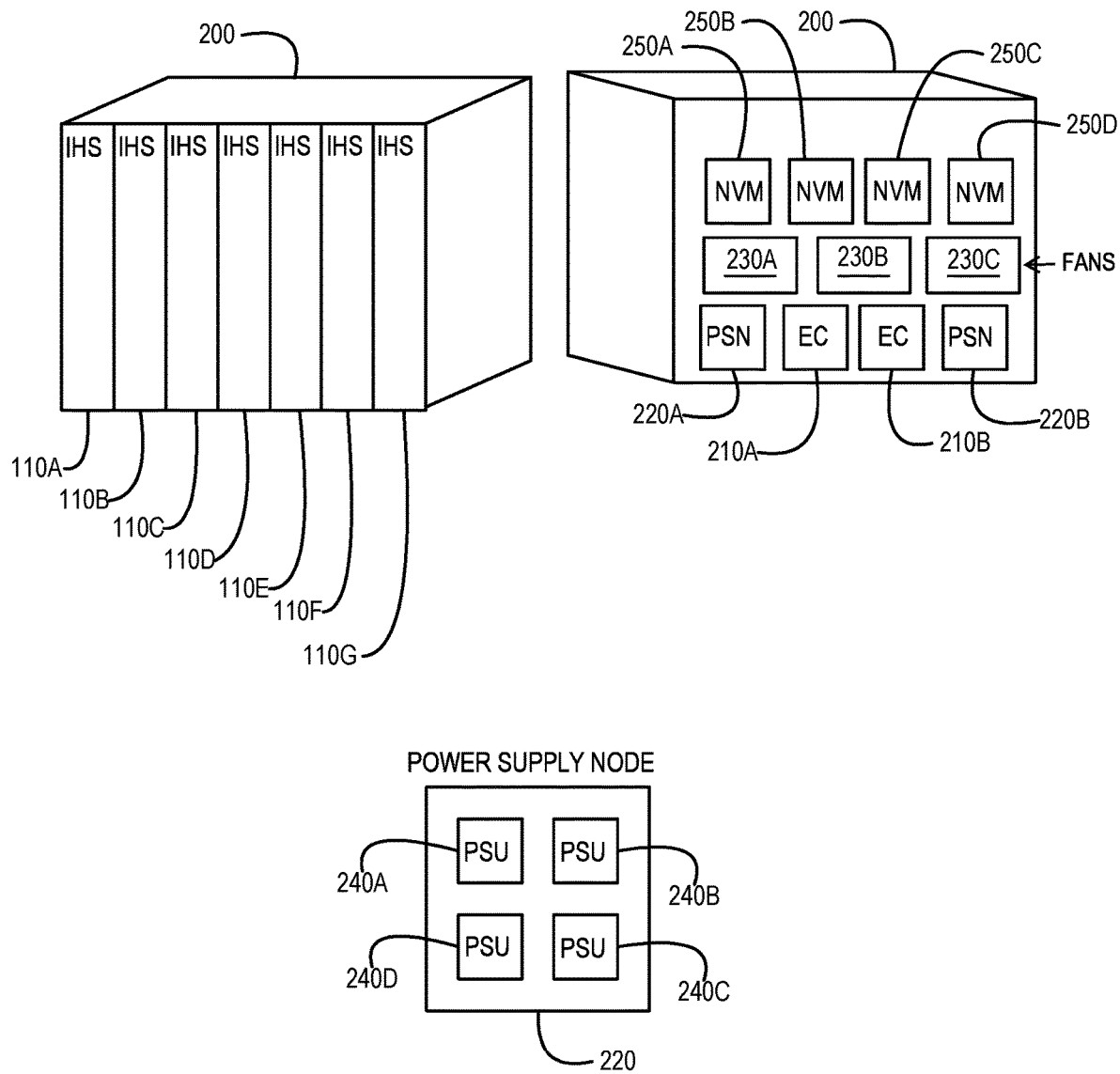
FIG. 2 illustrates an example of an information handling system chassis, according to one or more embodiments.

Turning now to FIG. 2, an example of an information handling system chassis is illustrated, according to one or more embodiments. As shown, an information handling system chassis 200 may include and/or may be configured to include multiple information handling systems (IHSs). For example, chassis 200 may and/or may be configured to include IHSs 110A-110G. For instance, one or more of IHSs 110A-110G may be removable. In one or more embodiments, a first IHS 110 may be swapped for a second IHS 110, different from the first IHS 110.

In one or more embodiments, chassis 200 may include one or more enclosure controllers. As illustrated, chassis 200 may include enclosure controllers (ECs) 210A and 210B. In one or more embodiments, an enclosure controller (EC) 210 may be or include a chassis management controller. For example, an EC 210 may manage one or more components of chassis 200. In one or more embodiments, chassis 200 may include one or more power supply nodes (PSNs). As shown, chassis 200 may include PSNs 220A and 220B. In one or more embodiments, a power supply node (PSN) 220 may include one or more power supply units (PSUs) 240. For example, a PSN 220 may include multiple power PSUs 240A-240D. For instance, if one of the multiple PSUs is associated with an issue, PSN 220 may continue to provide power to chassis 200 via one or more other PSUs. In one or more embodiments, one or more of PSNs 220A and 220B may be removable. For example, a first PSN 220 may be swapped for a second PSN 220, different from the first PSN 220. In one instance, the first PSN 220 may be swapped for the second PSN 220 without ceasing operations of one or more of IHSs 110A-110G. In one instance, the first PSN 220 may be swapped for the second PSN 220 without throttling one or more of IHSs 110A-110G. In one or more embodiments, one or more of ECs 210A and 210B may be removable. For example, a first EC 210 may be swapped for a second EC 210, different from the first EC 210. For instance, the first EC 210 may be swapped for the second EC 210 without ceasing operations of one or more of IHSs 110A-110G.

In one or more embodiments, chassis 200 may include one or more fans. For example, the one or more fans may provide airflow through various one or more portions of chassis 200. For instance, the airflow through various one or more portions of chassis 200 may remove heat from one or more portions of chassis 200 and/or one or more portions of one or more IHSs 110. As illustrated, chassis 200 may include fans 230A-230C. In one or more embodiments, an EC 210 may monitor one or more fans 230, one or more temperatures of one or more portions of chassis 200, one or more PSUs 240, and/or one or more PSNs 220, among others. In one or more embodiments, EC 210 may control one or more portions and/or one or more components of chassis 200. In one or more embodiments, EC 210 may include one or more structures and/or one or more functionalities as those described with reference to IHS 110. In one or more embodiments, EC 210 may include one or more structures and/or one or more functionalities as those described with reference to BMC 185. In one or more embodiments, EC 210 may be configured, coded, and/or encoded with instructions in accordance with one or more of systems, flowcharts, methods, and/or processes described herein.

In one or more embodiments, chassis 200 may include one or more non-volatile memory media. For example, chassis 200 may include non-volatile memory media 250A-250D. In one or more embodiments, a non-volatile memory medium 250 may include one or more structures and/or one or more functionalities as those described with reference to non-volatile memory medium 160. In one or more embodiments, one or more of non-volatile memory media 250A-250D may provide storage for one or more of IHSs 110A-110G.

Figure 3:
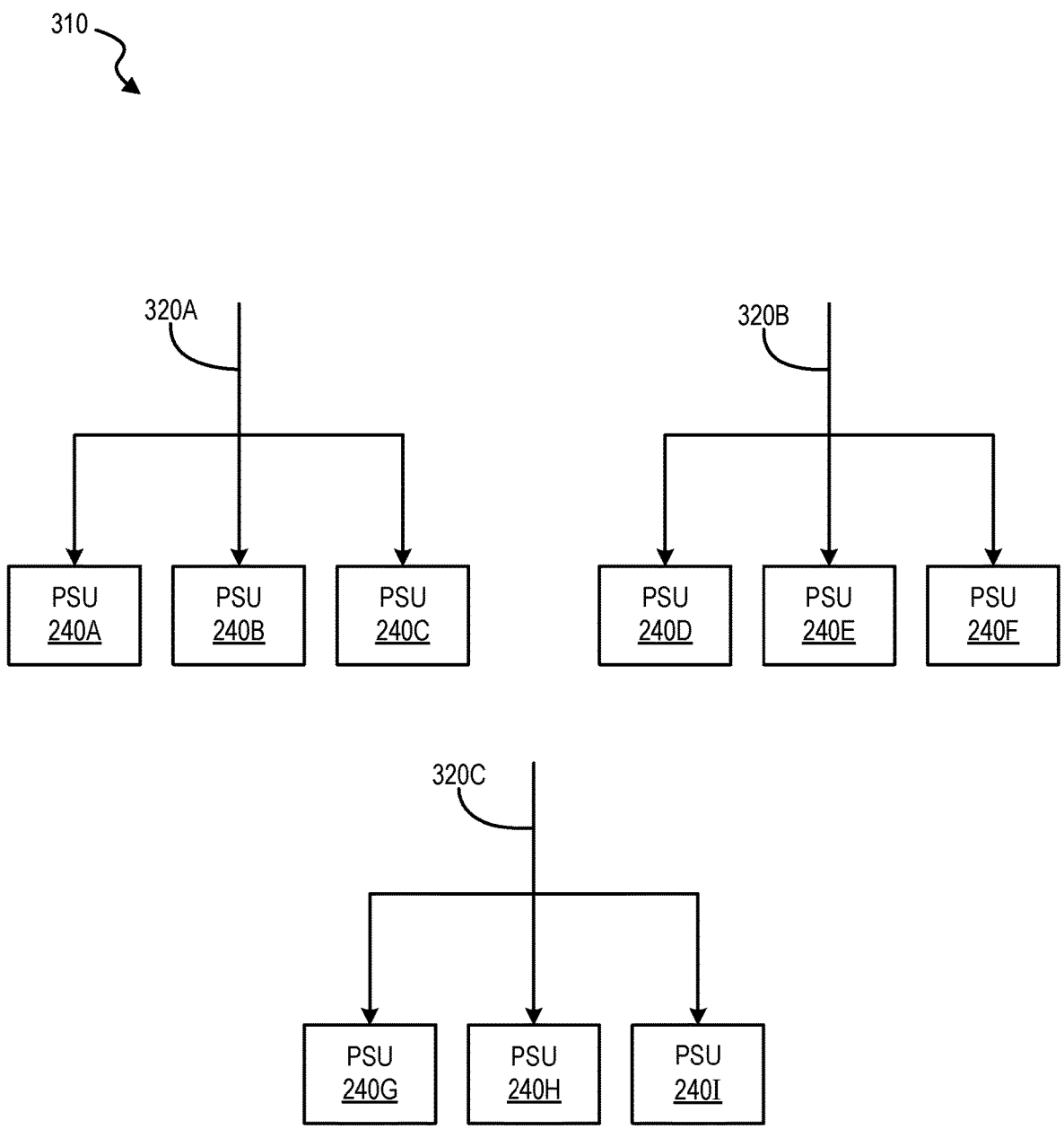
FIG. 3 illustrates an example of a power supply system, according to one or more embodiments.

Turning now to FIG. 3, an example of a power supply system is illustrated, according to one or more embodiments. As shown, a power supply system 310 may include power supply grids 320A-320C. In one or more embodiments, chassis 210 may house power supply system 310. In one or more embodiments, IHS 110 may house power supply system 310. As illustrated, power supply grid 320A may include PSUs 240A-240C. As shown, power supply grid 320B may include PSUs 240D-240F. As illustrated, power supply grid 320C may include PSUs 240G-240I. In one or more embodiments, chassis 210 may house one or more of power supply grids 320A-320C. In one or more embodiments, IHS 110 may house one or more of power supply grids 320A-320C. In one or more embodiments, one or more of PSUs 240A-240I may be removable. For example, a first PSU 240 may be swapped for a second PSU 240, different from the first PSU 240. In one instance, the first PSU 240 may be swapped for the second PSU 240 without ceasing operations of one or more of IHSs 110A-110G. In another instance, the first PSU 240 may be swapped for the second PSU 240 without throttling of one or more of IHSs 110A-110G.

Figure 4:
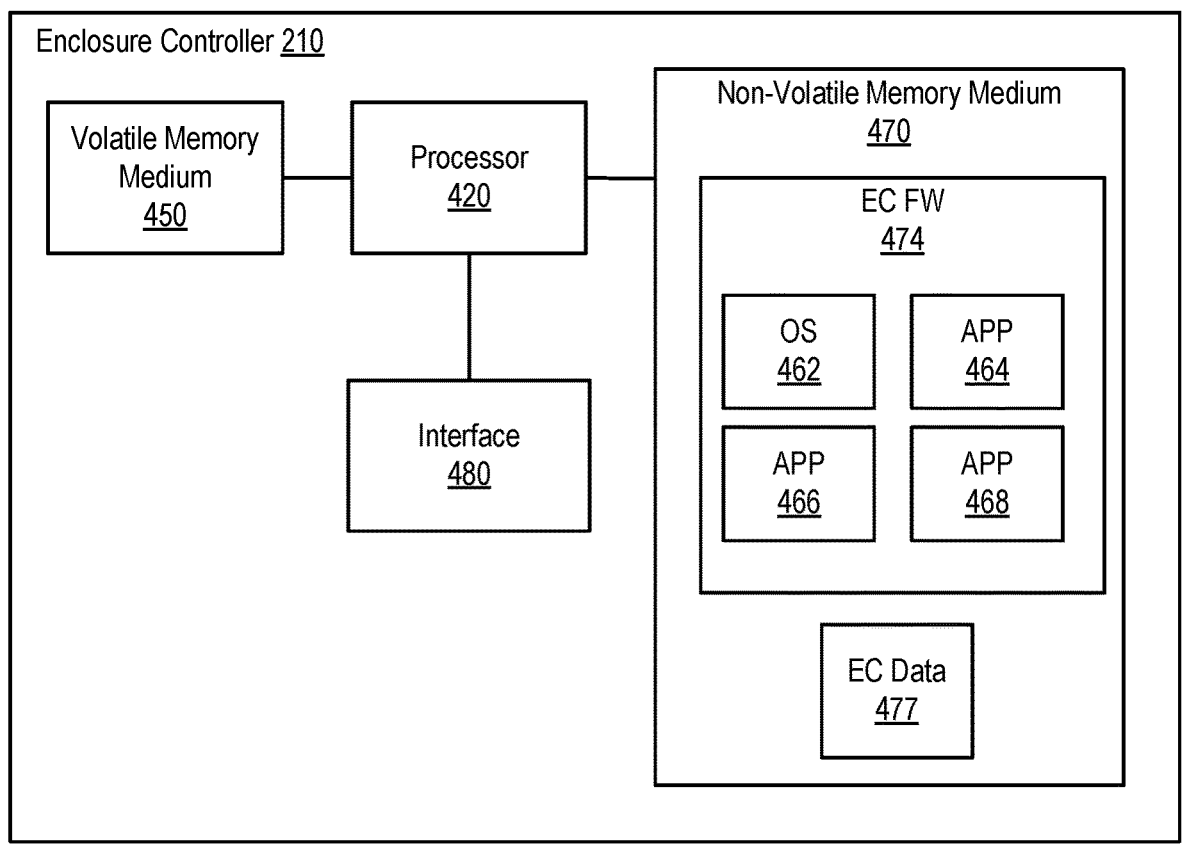
FIG. 4 illustrates an example enclosure controller, according to one or more embodiments.

Turning now to FIG. 4, an example enclosure controller is illustrated, according to one or more embodiments. As shown, EC 210 may include a processor 420, a volatile memory medium 450, a non-volatile memory medium 470, and an interface 480. As illustrated, non-volatile memory medium 470 may include an EC firmware (FW) 474, which may include an OS 462 and APPs 464-468, and may include EC data 477. In one example, OS 462 may be or include a real-time operating system (RTOS). In another example, OS 462 may be or include an Unix-like operating system.

In one or more embodiments, interface 480 may include circuitry that enables communicatively coupling to one or more devices. In one example, interface 480 may include circuitry that enables communicatively coupling to one or more buses. In a second example, interface 480 may include circuitry that enables one or more interrupt signals to be received. In one instance, interface 480 may include general purpose input/output (GPIO) circuitry, and the GPIO circuitry may enable one or more interrupt signals to be received and/or provided via at least one interrupt line. In another instance, interface 480 may include GPIO circuitry that may enable EC 210 to provide and/or receive signals associated with other circuitry (e.g., diagnostic circuitry, etc.). In a third example, interface 480 may include circuitry that enables communicatively coupling to one or more networks. In one instance, interface 480 may include circuitry that enables communicatively coupling to network interface 180. In another example, interface 480 may include a network interface. In another example, interface 480 may include circuitry that enables EC 210 to provide periodic signals to one or more of IHSs 110A-110G. For instance, the periodic signals may be or include "heartbeat" signals. In one or more embodiments, one or more of IHSs 110A-110G may expect a "heartbeat" signal within an amount of time. For example, if a "heartbeat" signal is not received within the amount of time, it may be determined that an issue with EC 210 has occurred.

In one or more embodiments, one or more of OS 462 and APPs 464-468 may include processor instructions executable by processor 420. In one example, processor 420 may execute processor instructions of one or more of OS 462 and APPs 464-468 via non-volatile memory medium 470. In another example, one or more portions of the processor instructions of the one or more of OS 462 and APPs 464-468 may be transferred to volatile memory medium 450, and processor 420 may execute the one or more portions of the processor instructions of the one or more of OS 462 and APPs 464-468 via volatile memory medium 450. In one or more embodiments, processor 420 may execute instructions in accordance with one or more of systems, flowcharts, methods, and/or processes described herein. For example, non-volatile memory medium 470 and/or volatile memory medium 460 may store instructions that may be executable in accordance with one or more of systems, flowcharts, methods, and/or processes described herein. In one or more embodiments, processor 420 may execute instructions in accordance with at least a portion of one or more of systems, flowcharts, methods, and/or processes described herein. For example, non-volatile memory medium 470 and/or volatile memory medium 460 may store instructions that may be executable in accordance with at least a portion of one or more of systems, flowcharts, methods, and/or processes described herein. In one or more embodiments, processor 420 may utilize EC data 477. In one example, processor 420 may utilize EC data 477 via non-volatile memory medium 470. In another example, one or more portions of EC data 477 may be transferred to volatile memory medium 450, and processor 420 may utilize EC data 477 via volatile memory medium 450.

Figure 5:
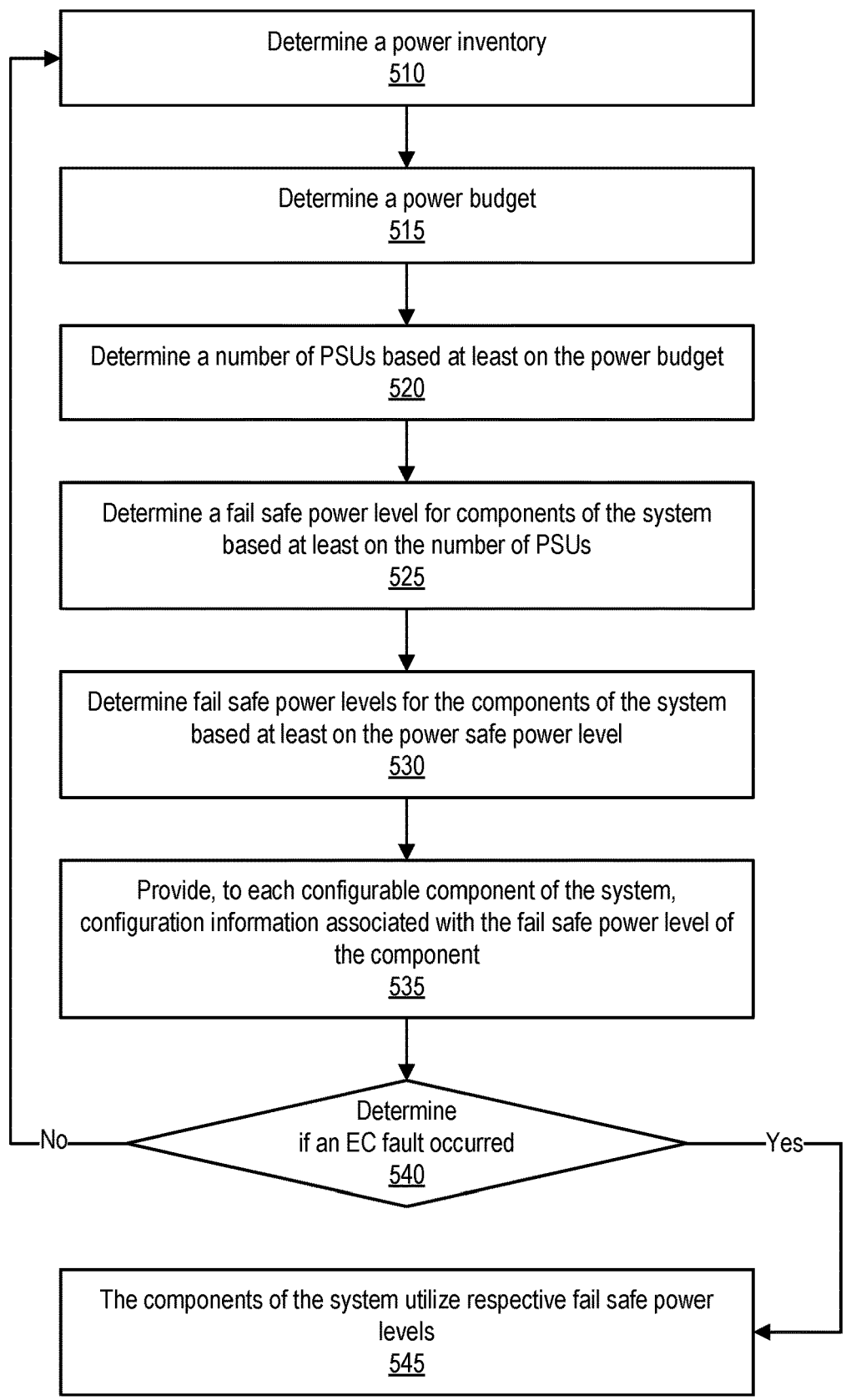
FIG. 5 illustrates a method of operating a system, according to one or more embodiments.

Turning now to FIG. 5, a method of operating a system is illustrated, according to one or more embodiments. At 510, a power inventory of a system may be determined. In one or more embodiments, the system may be or include a chassis. For example, the chassis may be chassis 200. For instance, EC 210 may determine a power inventory of chassis 200.

In one or more embodiments, determining a power inventory of chassis 200 may include determining power consumption of components of chassis 200. In one example, the components of chassis 200 may include one or more information handling systems. For instance, the components of chassis 200 may include one or more of IHSs 110A-110G. In a second example, the components of chassis 200 may include one or more fans. For instance, the components of chassis 200 may include one or more of fans 230A-230C. In a third example, the components of chassis 200 may include one or more non-volatile memory media. For instance, the components of chassis 200 may include one or more of non-volatile memory media 250A-250D. In a fourth example, the components of chassis 200 may include one or more I/O modules. In one instance, the one or more I/O modules may include one or more network interfaces. In a second instance, the one or more I/O modules may include one or more PCIe interfaces. In a third instance, the one or more I/O modules may include one or more USB interfaces. In a fourth instance, the one or more I/O modules may include one or more SAS interfaces. In a fifth instance, the one or more I/O modules may include one or more SATA interfaces. In another instance, the one or more I/O modules may include one or more machine independent interfaces (MIIs) (e.g., gigabit media-independent interfaces (GMIIs), serial gigabit media-independent interfaces (SGMIIs), ten gigabit per second gigabit media-independent interfaces (XGMIIs), etc.). In another example, the components of chassis 200 may include one or more other components.

In one or more embodiments, determining power consumption of components of chassis 200 may include querying the components of chassis 200. For example, EC 210 may query the components of chassis 200. In one instance, a query of a component may include a request for an amount of power that the component is currently utilizing. In a second instance, a query of a component may include a request for an amount of power associated with a NLB power level of the component. In a third instance, a query of a component may include a request for an amount of power associated with a TDP power level of the component. In another instance, a query of a component may include a request for an amount of power associated with a FTB power level of the component.

At 515, a power budget may be determined. In one or more embodiments, determining a power budget may include determining a sum of TDP power levels of the components of the system. At 520, a number of PSUs may be determined base at least on the power budget. In one or more embodiments, determining a number of PSUs base at least on the power budget may include determining a number of PSUs that may provide at least the power budget. For example, the number of PSUs may be an integer number of PSUs that meet or exceed the power budget. In one or more embodiments, the number of PSUs may be associated with PSUs of a power supply grid. In one or more embodiments, chassis 200 may house multiple power supply grids that are configured for grid redundancy. For example, at least two of the multiple power supply grids may include the integer number of power supply units. For instance, at least two of power supply grids 320A-320C may include the integer number of power supply units.

At 525, a fail safe power level for the components of the system may be determined. In one or more embodiments, determining a fail safe power level for the components of the system may include determining a fraction of power provided by the number of PSUs. For example, the fail safe power level for the components of the system may be eighty percent (80%) of the power provided by the number of PSUs. For instance, the fail safe power level for the components of the system may provide a power overhead budget of twenty percent (20%) of the power provided by the number of PSUs. In one or more embodiments, providing a power overhead budget may permit one or more power consumption spikes that may not overload one or more of the PSUs. For example, permitting one or more power consumption spikes that may not overload one or more of the PSUs may permit one or more of IHSs 110A-110G to continue operations. For instance, the one or more of IHSs 110A-110G may continue operations through the one or more power consumption spikes.

At 530, fail safe power levels for the components of the system may be determined based at least on the fail safe power level. In one or more embodiments, a fail safe power level for a component of the system may be based at least on a contribution of the component to the power budget. For example, determining a fail safe power level for a component of the system may include determining the fail safe power level multiplied by a contribution of the component to the power budget divided by the power budget.

At 535, configuration information may be provided to each component of the system, where the configuration information is associated with the fail safe power level associated with the component. In one example, configuration information provided to a component of the system may include information that instructs the component not to exceed the fail safe power level associated with the component. In another example, configuration information provided to a component of the system may include information that instructs the component to operate at the fail safe power level associated with the component.

At 540, it may be determined if an EC fault occurred. If an EC fault did not occur, the method may proceed to 510, according to one or more embodiments. If an EC fault occurred, the components of the system may utilize respective fail safe power levels, at 545. In one or more embodiments, the components of the system utilizing respective fail safe power levels may include the components of the system utilizing respective power levels that do not exceed their respective fail safe power levels. In one or more embodiments, determining if an EC fault occurred may include determining if a signal from the EC was not received within an amount of time. For example, device 190 may receive periodic signals from EC 210. In one instance, if device 190 receives a signal from EC 210 within an amount of time, device 190 may determine that an EC fault has not occurred. In another instance, if device 190 does not receive a signal from EC 210 within an amount of time, device 190 may determine that an EC fault occurred. In one or more embodiments, device 190 may configure an IHS 110 to utilize a respective fail safe power level of the fail safe power level. For example, if device 190 determines that an EC fault occurred, device 190 may configure IHS 110 to utilize a respective fail safe power level of the fail safe power levels.

Figure 6:
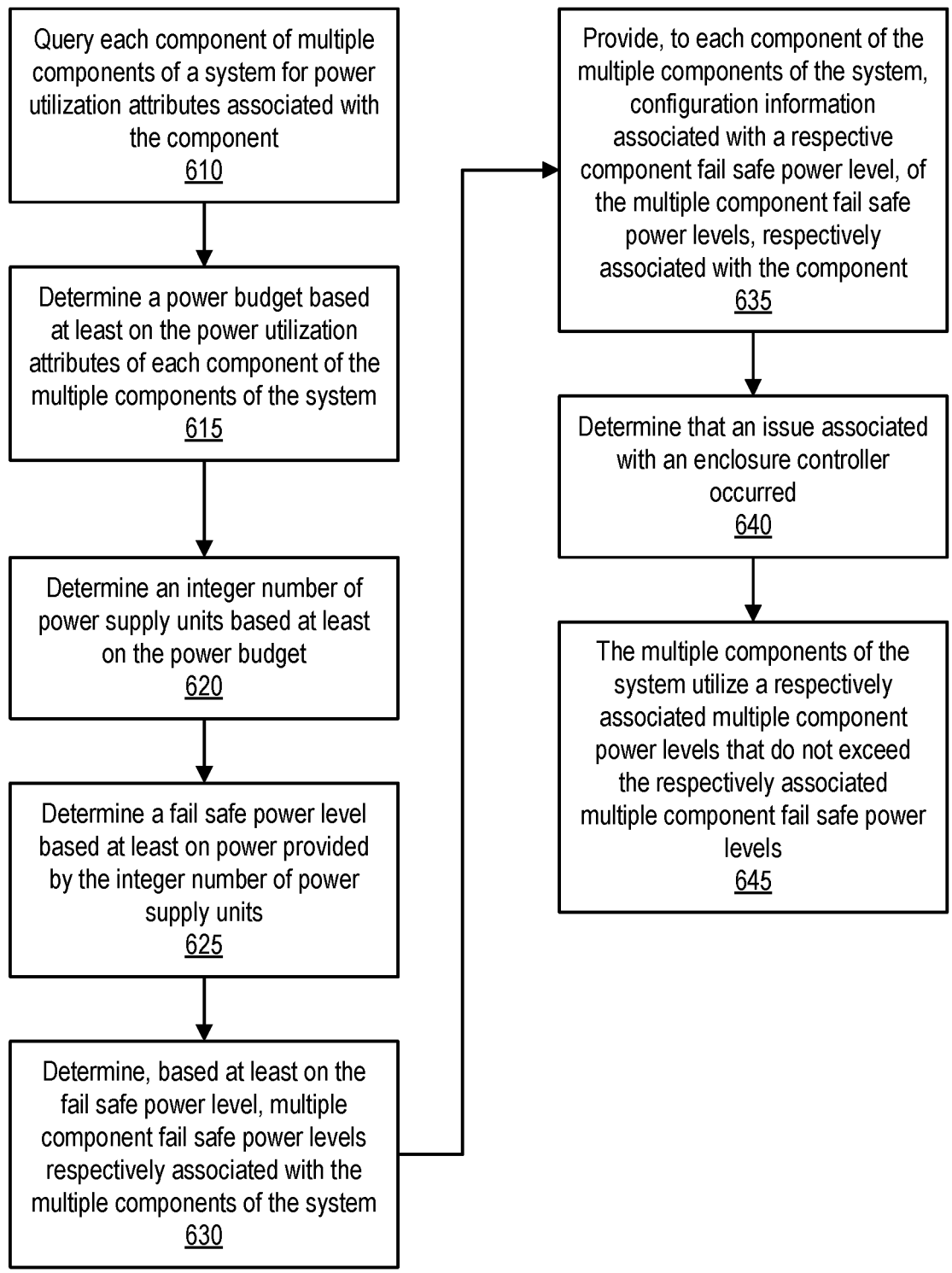
FIG. 6 illustrates another method of operating a system, according to one or more embodiments.

Turning now to FIG. 6, another method of operating a system is illustrated, according to one or more embodiments. At 610, each component of multiple components of a system may be queried for power utilization attributes associated with the component. In one or more embodiments, power utilization attributes associated with the component may include multiple power utilization levels associated with the component. For instance, multiple power utilization levels associated with the component may include one or more of a NLB power level, a TDP power level, and a FTB power level, among others. In one or more embodiments, querying a component of the system for power utilization attributes associated with the component may include receiving the power utilization attributes associated with the component from the component.

At 615, a power budget based at least on the power utilization attributes of each component of the multiple components of the system may be determined. For example, a power budget may be determined based at least on the TDP power level of each component of the multiple components of the system. For instance, the power budget may include summing the TDP power levels of the multiple components of the system. At 620, an integer number of power supply units may be determined based at least on the power budget. For example, an integer number of power supply units that meet or exceed the power budget may be determined.

At 625, a fail safe power level may be determined based at least on power provided by the integer number of power supply units. In one or more embodiments, determining a fail safe power level based at least on power provided by the integer number of power supply units may include determining a fraction of power provided by the integer number of power supply units. For example, the fail safe power level may be eighty percent (80%) of the power provided by the integer number of power supply units. For instance, the fail safe power level may provide a power overhead budget of twenty percent (20%) of the power provided by the integer number of power supply units. In one or more embodiments, providing a power overhead budget may permit one or more power consumption spikes that may not overload one or more of the power supply units. For example, permitting one or more power consumption spikes that may not overload one or more of the power supply units may permit one or more of IHSs 110A-110G to continue operations. For instance, the one or more of IHSs 110A-110G may continue operations through the one or more power consumption spikes. In one or more embodiments, providing a power overhead budget may allow for one or more issues associated with one or more power supply units. For example, a power supply unit may malfunction and/or fail. For instance, the power overhead budget may permit one or more of IHSs 110A-110G to continue operations if one or more issues associated with one or more power supply units may arise.

At 630, multiple component fail safe power levels respectively associated with the multiple components of the system may be determined based at least on the fail safe power level. In one or more embodiments, a fail safe power level for a component of the system may be based at least on a contribution of the component to the power budget. For example, determining a fail safe power level for a component of the system may include determining the fail safe power level multiplied by a contribution of the component to the power budget divided by the power budget.

At 635, configuration information may be provided to each component of the multiple components of the system, where the configuration information is associated with a respective component fail safe power level, of the multiple component fail safe power levels, respectively associated with the component. In one or more embodiments, providing configuration information associated with a component fail safe power level of an IHS 110 may include providing the configuration information to device 190 of IHS 110. For example, the configuration information associated with the component fail safe power level of IHS 110 may be provided to device 190. In one or more embodiments, the configuration information may include a maximum clock rate of a processor of an information handling system. In one or more embodiments, the configuration information may include a reduced clock rate of a processor of an information handling system.

At 640, it may be determined that an issue associated with an enclosure controller occurred. In one example, the issue associated with the enclosure controller may include a loss of communication with the enclosure controller. In a second example, the issue associated with the enclosure controller may include a malfunction of the enclosure controller. In a third example, the issue associated with the enclosure controller may include a failure of the enclosure controller. In another example, the issue associated with the enclosure controller may include a swapping of the enclosure controller. In one or more embodiments, device 190 may determine that an issue associated with an enclosure controller occurred. For example, the issue associated with the enclosure controller may include a loss of communication with the enclosure controller. For instance, device 190 may receive periodic signals from EC 210. In one or more embodiments, device 190 may not receive an expected signal from EC 210 within an amount of time. For example, device 190 may determine that an issue associated with the enclosure controller occurred based at least on not receiving an expected signal from EC 210 within an amount of time.

At 645, the multiple components of the system may utilize a respectively associated multiple component power levels that do not exceed the respectively associated multiple component fail safe power levels. In one or more embodiments, the multiple components of the system may utilize the respectively associated multiple component power levels that do not exceed the respectively associated multiple component fail safe power levels may be performed in response to determining that the issue associated with the enclosure controller. In one or more embodiments, device 190 may configure IHS 110 to utilize a respective fail safe power level of the fail safe power levels. For example, if device 190 determines that an issue associated with an enclosure controller occurred, device 190 may configure IHS 110 to utilize a respective fail safe power level of the fail safe power levels.

In one or more embodiments, configuring IHS 110 to utilize the respective fail safe power level of the fail safe power levels may include device 190 configuring IHS 110 to process less information within a time period. In one or more embodiments, configuring IHS 110 to utilize the respective fail safe power level of the fail safe power levels may include device 190 configuring processor 120 of IHS 110 not exceed a clock rate.

In one or more embodiments, the multiple components of the system may utilize the respectively associated multiple component power levels that do not exceed the respectively associated multiple component fail safe power levels may include at least two of the multiple components of the system reducing respective power consumptions. For example, two or more of one or more information handling systems, one or more fans, one or more I/O modules, and/or one or more non-volatile storage media, among others, of the system may reduce respective power consumptions. In one or more embodiments, at least one of the multiple components of the system may utilize a first power level, and then utilize a second power level. For example, the second power level may be greater than the first power level and not exceeding a respectively associated component fail safe power level of the at least one of the multiple components of the system.

In one or more embodiments, the multiple components of the system may include multiple information handling systems. For example, the multiple components of the system may utilize the respectively associated multiple component power levels that do not exceed the respectively associated multiple component fail safe power levels may include configuring at least one information handling system of the multiple information handling systems to process less information within a time period. For instance, configuring the at least one information handling system of the multiple information handling systems to process less information within the time period may include configuring a processor of the at least one information handling system of the multiple information handling systems to not exceed a clock rate. In one or more embodiments, configuring the at least one information handling system of the multiple information handling systems to process less information within the time period may include configuring a processor of the at least one information handling system of the multiple information handling systems with a slow clock rate than a clock rate utilized before determining that the issue associated with the enclosure controller occurred.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:
1. A system, comprising:
a chassis configured to house a plurality of information handling systems, and a plurality of power supply units;

an enclosure controller communicatively coupled to each information handling system of the plurality of information handling systems and configured to:
  query each information handling system for a plurality of power utilization attributes associated with the information handling system, wherein the plurality of power utilization attributes comprises a node lower boundary power level, a thermal design point power level, and a fault tolerant boundary;
  determine a thermal design point power budget for the chassis based at least on the thermal design point power level of each information handling system of the plurality of information handling systems;
  determine an integer number of power supply units based at least on the thermal design point power budget;
  determine a fail safe power level power budget for the chassis as a percentage of the thermal design point power level, wherein the integer number of power supply units are to provide power according to the fail safe power level power level power budget during a failure;
  determine, based at least on the fail safe power level power budget for the chassis, fail safe power level associated with each information handling system of the plurality of information handling systems; and
  provide, to each information handling system of the plurality of information handling systems, configuration information comprising the fail safe power level respectively associated with the information handling system;
  wherein each information handling system of the plurality of information handling systems includes a respective controller configured to:
    communicate with the enclosure controller to receive the configuration information; and
    if an issue associated with the enclosure controller occurs, configure the information handling system to utilize a second power level that is greater than a respectively associated node lower boundary power level and that does not exceed its respectively associated fail safe power level.

2. The system of claim 1, wherein the fail safe power level power budget comprises 80% of the thermal design point power level.

3. The system of claim 1, wherein:
the enclosure controller is configured to determine the integer number of power supply units based on redundancy.

4. The system of claim 1, wherein a surplus power supplied by the number of power supply units is allocated to one or more components in the chassis.

5. The system of claim 4, wherein the surplus power is allocated for loss of capacity of a power supply unit of the integer number of power supply units.

6. The system of claim 1, wherein:
the enclosure controller is configured to send a signal to each information handling system of the plurality of information handling systems;
the controller in each information handling system comprises a baseboard management controller; and
if the baseboard management controller does not receive the signal, the baseboard management controller is configured to determine the issue has occurred.

7. The system of claim 6, wherein:
the signal comprises a periodic signal; and
to determine that the issue associated with the enclosure controller occurred comprises the baseboard management controller determining that the issue associated with the enclosure controller occurred based at least on not receiving the signal from the enclosure controller within an amount of time.

8. The system of claim 1,
wherein the chassis comprises a plurality of power supply grids that are configured for grid redundancy; and
wherein at least two of the plurality of power supply grids include the integer number of power supply units.

9. A method, comprising:
querying, by an enclosure controller, each information handling system of a plurality of information handling systems in a chassis of a system for a plurality of power utilization attributes associated with the information handling system, wherein the plurality of power utilization attributes comprises a node lower boundary power level, a thermal design point power level, and a fault tolerant boundary power level;
determining a thermal design point power budget for the system based at least on the thermal design point power level of each information handling system of the plurality of information handling systems;
determining an integer number of power supply units based at least on the thermal design point power budget;
determining a fail safe power level power budget for the system as a percentage of the thermal design point power level, wherein the integer number of power supply units are to provide power according to the fail safe power level power level power budget during a failure;
determining, based at least on the fail safe power level power budget for the system, a fail safe power level respectively associated with each information handling system of the plurality of information handling systems;
providing, to each information handling system of the plurality of information handling systems, configuration information comprising the fail safe power level respectively associated with the information handling system;
if a controller associated with an information handling system of the plurality of information handling systems determines that an issue associated with the enclosure controller has occurred, configuring each respective information handling system in the plurality of information handling systems of the system to utilize a second power level that is greater than a respectively associated node lower boundary power level and that does not exceed the respectively associated fail safe power level.

10. The method of claim 9, wherein the fail safe power level power budget comprises 80% of the thermal design point power level.

11. The method of claim 9, wherein
the enclosure controller is configured to determine the integer number of power supply units required for redundancy.

12. The method of claim 9, further comprising supplying surplus power by the integer number of power supply units to one or more components in the system.

13. The method of claim 12, further comprising allocating the surplus power to the one or more components for a loss of capacity of a power supply unit of the integer number of power supply units.

14. The method of claim 12, further comprising:
the enclosure controller sending a signal to each information handling system of the plurality of information handling systems, wherein the controller in each information handling system comprises a baseboard management controller; and
the baseboard management controller determining the issue has occurred if the baseboard management controller does not receive the signal.

15. The method of claim 14,
if the controller for the information handling system does not receive the signal within a time period, the baseboard management controller determining the issue has occurred.

16. An enclosure controller, comprising:
a processor; and
a memory medium, coupled to the at least one processor, that stores instructions executable by the processor, which when executed by the processor, cause the enclosure controller to:
query each information handling system of a plurality of information handling systems of a system for a plurality of power utilization attributes associated with the information handling system, wherein the plurality of power utilization attributes comprises a node lower boundary power level, a thermal design point power level, and a fault tolerant boundary power level;
determine a thermal design point power budget for the system based at least on the thermal design point power level of each information handling system of the plurality of information handling systems;
determine an integer number of power supply units based at least on the power budget;
determine a fail safe power level power budget for the system as a percentage of the thermal design point power level, wherein the integer number of power supply units are to provide power according to the fail safe power level power level power budget during a failure;
determine, based at least on the fail safe power level power budget for the system, fail safe power level respectively associated with each information handling system; and
provide, to each information handling system of the plurality of information handling systems, configuration information comprising the fail safe power level respectively associated with the information handling system;
wherein if an issue associated with the enclosure occurs, each information handling system is to utilize a second power level that is greater than a respectively associated node lower boundary power level and that does not exceed its respectively associated fail safe power level.

17. The enclosure controller of claim 16, wherein the fail safe power level power budget comprises 80% of the thermal design point power level.

18. The enclosure controller of claim 16, wherein:
the instructions further cause the enclosure controller to provide periodic signals to each information handling system of the plurality of information handling systems;
the controller in each information handling system comprises a baseboard management controller; and
if the baseboard management controller does not receive the signal, the baseboard management controller is configured to determine the issue has occurred.

19. The enclosure controller of claim 16, wherein the configuration information includes a maximum clock rate of a processor of the information handling system.

20. The enclosure controller of claim 16, wherein the enclosure controller is configured to determine the integer number of power supply units based on redundancy.

* * * * *